Patented Sept. 4, 1934

1,972,476

UNITED STATES PATENT OFFICE 1,972,476

PRODUCTION OF ACETALDEHYDE AND ACETIC ACID

Ernst Eberhardt, Ludwigshafen-on-the-Rhine, Germany, assignor to I. G. Farbenindustrie Aktiengesellschaft, Frankfort - on - the - Main, Germany No Drawing. Application February 6, 1931, Serial No. 514,069. In Germany February 22, 1930

10 Claims. (Cl. 260—116)

The present invention relates to the catalytic production of acetaldehyde and acetic acid.

It has already been proposed to prepare acetaldehyde and acetic acid, or mixtures of both, by mixing acetylene, or gases containing acetylene, with water vapor and passing them over hydration catalysts consisting of or comprising mercury compounds or mixtures thereof with other heavy metal salts, carriers or other additions.

I have now found that acetaldehyde or acetic acid, or mixtures of both, are obtained with particularly valuable results by leading a gaseous mixture containing acetylene, water vapor and oxygen and laden with mercury vapor over a hydration catalyst at elevated temperatures preferably between 100° and 300° C. The process according to this invention is particularly valuable for the conversion of gaseous mixtures poor in acetylene such as can be obtained by bringing gaseous hydrocarbons, as for example methane or mineral gas, into contact with an electric arc and containing for example from 6 to 8 per cent of acetylene, from 7 to 10 per cent of methane, about 4 per cent of nitrogen and large quantities of hydrogen.

For example, the mixture containing acetylene, water vapor and oxygen before passage over the catalyst, is led through or over mercury heated to temperatures up to about 300° C. and arranged at a convenient place in the reaction chamber or outside the same. The mercury separated in a suitable manner, as for example by cooling, from the gaseous mixture after the reaction may be employed again for the reaction. In the said manner it is not only possible to impart to the catalyst a practically unlimited life, but also to obtain higher throughputs so that even at high speeds the whole of the acetylene contained in the initial gas is converted.

The hydration catalysts suitable for carrying out the process according to the present invention may consist of mercury compounds, or mixtures thereof with salts of any other heavy metals, or with other additions such as metal oxides. A catalyst may also be employed which consists of a porous carrier laden with an inorganic acid compound, which is not volatilized under the conditions of working and is therefore referred to as non-volatile in the following and in the claims, such as a free acid or its acid salt, for example acid potassium phosphate. As porous carriers may be mentioned those usually employed for catalysts, as for example activated carbon, clay shards, pumice stone, kieselguhr, activated silicic acid, porous glass masses, and the like. Suitable non-volatile inorganic acid compounds are for example phosphoric acid, sulphuric acid, boric acid, phosphotungstic acid, chromic acid, tungstic acid and the like as well as their acid salts. Metal compounds, such as metal oxides, as for example aluminium oxide, chromium oxide, zinc oxide, iron oxide, mercury oxide, vanadium pentoxide, manganese oxide, molybdenum oxide or cerium oxide or also metal salts, such as chromium phosphate, iron sulphate, zinc phosphate, aluminium nitrate, tin vanadate, zinc acetate or other salts of the metals, the oxides of which are referred to above, with the aforesaid non-volatile acids may be added to the catalysts.

The following examples will further illustrate the nature of this invention but the invention is not restricted to these examples.

*Example 1*

A gaseous mixture which consists of 6 per cent by volume of acetylene, 84 per cent of hydrogen and 10 per cent of oxygen and which has been saturated with water vapor at from 70° to 80° C. is led at 260° C. through metallic mercury and then at the same temperature over active carbon on which mercuric phosphate has been precipitated. A yield of 40 per cent of acetic acid and 38 per cent of acetaldehyde, calculated on the theoretical yield from the amount of acetylene employed, is obtained. The speed of flow is about 24 liters of the initial gaseous mixture per 200 cubic centimeters of catalyst as against 3 liters of gas mixture per hour with the same catalyst, but without mercury vapor in which latter case 57 per cent of acetic acid and 5.1 per cent of aldehyde are obtained.

*Example 2*

A gaseous mixture obtained by the action of an electric arc on methane and consisting of 6 per cent by volume of acetylene, 84 per cent of hydrogen and 10 per cent of oxygen added and which has been saturated with water vapor at from about 70° to 80° C. is passed at 260° C. through metallic mercury and then at the same temperature over activated carbon on to which have been applied 10 cubic centimeters of a 66 per cent aqueous phosphoric acid in 30 cubic centimeters of water for each 200 cubic centimeters of the activated carbon. A yield of 26 per cent of acetic acid and 43 per cent of acetaldehyde, calculated with reference to the theoretical yield from the acetylene employed, is obtained. By adding to each 200 cubic centimeters of the activated carbon impregnated with phosphoric acid, the following amounts of metal oxides, the following yields are obtained at the temperatures stated:

2 grams of zinc oxide, at 260° C. {36 per cent acetic acid / 40 per cent acetaldehyde.
8 grams of alumina and 11 grams of mercury oxide {45 per cent acetic acid / 30 per cent acetaldehyde.
2 grams of iron hydroxide at 260° C. {33 per cent acetic acid / 40 per cent acetaldehyde.
0.5 gram of vanadium pentoxide at 230° {23 per cent acetic acid / 51 per cent acetaldehyde.

The speed of flow of the gas mixture to be converted according to the present invention can be about 9 times as great as when working with solid mercury catalysts in the absence of mercury vapor; for example it may be about 29 liters of initial gaseous mixture per hour per 200 cubic centimeters of the said catalysts contrasted with 3 liters of gaseous mixture under the same conditions using a catalyst consisting of mercury phosphate in the absence of mercury vapor.

*Example 3*

Pure acetylene is mixed with 5 per cent by volume of oxygen and saturated with water vapor at 70° C., whereupon the mixture is passed at 230° C. through metallic mercury and then through active carbon impregnated with about 1/40 its volume of a 66 per cent aqueous phosphoric acid with a velocity of 16.4 liters of gaseous mixture per hour and per 300 cubic centimeters of the catalysts, whereby 5.1 grams of acetic acid and 79.4 grams of acetaldehyde are obtained. Without mercury vapor the yield is 1.8 grams of acetic acid and 9 grams of aldehyde only.

What I claim is:

1. In the catalytic production of acetaldehyde and acetic acid from acetylene, water vapor and oxygen by passing the said gaseous mixture over a hydration catalyst non-volatile under the conditions of the reaction while heating, the step which comprises initially saturating said gaseous mixture with mercury vapor before passing said gaseous mixture over said catalyst.

2. In the catalytic production of acetaldehyde and acetic acid from acetylene, water vapor, hydrogen and oxygen by passing the said gaseous mixture over a hydration catalyst non-volatile under the conditions of the reaction while heating, the step which comprises initially saturating said gaseous mixture with mercury vapor before passing said gaseous mixture over said catalyst.

3. In the catalytic production of acetaldehyde and acetic acid from acetylene, water vapor and oxygen by passing the said gaseous mixture over a hydration catalyst non-volatile under the conditions of the reaction, comprising a compound of mercury, while heating, the step which comprises initially saturating said gaseous mixture with mercury vapor before passing said gaseous mixture over said catalyst.

4. In the catalytic production of acetaldehyde and acetic acid from acetylene, water vapor and oxygen by passing the said gaseous mixture over a hydration catalyst non-volatile under the conditions of the reaction, comprising a compound of mercury and a salt of a heavy metal, while heating, the step which comprises initially saturating said gaseous mixture with mercury vapor before passing said gaseous mixture over said catalyst.

5. In the catalytic production of acetaldehyde and acetic acid from acetylene, water vapor and oxygen by passing the said gaseous mixture over a hydration catalyst non-volatile under the conditions of the reaction, comprising a compound of mercury deposited on a porous carrier, while heating, the step which comprises initially saturating said gaseous mixture with mercury vapor before passing said gaseous mixture over said catalyst.

6. In the catalytic production of acetaldehyde and acetic acid from acetylene, water vapor and oxygen by passing the said gaseous mixture over a hydration catalyst non-volatile under the conditions of the reaction comprising an inorganic, non-volatile acid compound deposited on a porous carrier, while heating, the step which comprises initially saturating said gaseous mixture with mercury vapor before passing said gaseous mixture over said catalyst.

7. In the catalytic production of acetaldehyde and acetic acid from acetylene, water vapor and oxygen by passing the said gaseous mixture over a hydration catalyst non-volatile under the conditions of the reaction, comprising an inorganic, non-volatile acid deposited on a porous carrier, while heating, the step which comprises initially saturating said gaseous mixture with mercury vapor before passing said gaseous mixture over said catalyst.

8. In the catalytic production of acetaldehyde and acetic acid from acetylene, water vapor and oxygen by passing the said gaseous mixture over a hydration catalyst non-volatile under the conditions of the reaction, comprising an inorganic, non-volatile acid and a metal compound of said acid deposited on a porous carrier, while heating, the step which comprises initially saturating said gaseous mixture with mercury vapor before passing said gaseous mixture over said catalyst.

9. In the catalytic production of acetaldehyde and acetic acid from acetylene, water vapor and oxygen by passing the said gaseous mixture over a hydration catalyst non-volatile under the conditions of the reaction, comprising phosphoric acid deposited on a carbon carrier, while heating, the step which comprises initially saturating said gaseous mixture with mercury vapor before passing said gaseous mixture over said catalyst.

10. In the catalytic production of acetaldehyde and acetic acid from acetylene, water vapor and oxygen by passing the said gaseous mixture over a hydration catalyst non-volatile under the conditions of the reaction, comprising acid potassium phosphate deposited on a carbon carrier while heating, the step which comprises initially saturating said gaseous mixture with mercury vapor before passing said gaseous mixture over said catalyst.

ERNST EBERHARDT.